Figure 1:
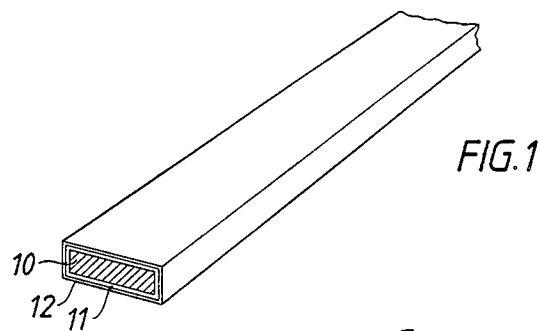

United States Patent [19]

Hjortsberg et al.

[11] Patent Number: 4,935,302

[45] Date of Patent: Jun. 19, 1990

[54] ELECTRICAL CONDUCTOR PROVIDED WITH A SURROUNDING INSULATION

[75] Inventors: Arne Hjortsberg; Goran Holmström; Lennart Johansson, all of Västerås; Thommy Karlsson, Bävlinge, all of Sweden

[73] Assignee: ASEA Brown Boveri AB, Västerås, Sweden

[21] Appl. No.: 171,438

[22] Filed: Mar. 21, 1988

[30] Foreign Application Priority Data

Mar. 24, 1987 [SE] Sweden ............................ 8701214

[51] Int. Cl.$^5$ .................. B32B 27/00; D02G 3/00
[52] U.S. Cl. .................. 428/383; 428/384; 428/389; 174/110 SR; 174/110 N; 174/110 PM; 174/110 S; 174/120 SR
[58] Field of Search ............ 428/383, 389, 372, 379; 174/121 SR, 120 SR, 110 N; 524/430, 431

[56] References Cited

U.S. PATENT DOCUMENTS

| | | | |
|---|---|---|---|
| 3,228,883 | 1/1966 | DiGiulio | 525/240 |
| 4,403,061 | 9/1983 | Brooks | 524/433 |
| 4,493,873 | 1/1985 | Keane et al. | 428/372 |
| 4,537,804 | 8/1985 | Keane et al. | 427/118 |

*Primary Examiner*—Lorraine T. Kendell
*Assistant Examiner*—Jill M. Gray
*Attorney, Agent, or Firm*—Watson, Cole, Grindle & Watson

[57] ABSTRACT

An electrical conductor is provided with an electrical insulation (11) surrounding the conductor (10) and a surrounding protective layer (12) which protects the insulation against degradation caused by corona. The protective layer consists of an organic polymer containing at least 10 percent by volume of a powdered filler in the form of chromium oxide, iron oxide, or a mixture of chromium oxide and iron oxide. The filler preferably has an intrinsic resistivity of $10^4$–$10^8$ ohm m. The thickness of the protective layer is preferably smaller than the thickness of the underlying insulation (11) and its resistivity preferably exceeds $10^{10}$ ohm m. The conductor is used, among other things, in windings and coils for electrical machines.

9 Claims, 2 Drawing Sheets

ELECTRICAL CONDUCTOR PROVIDED WITH A SURROUNDING INSULATION

The present invention relates to an electrical conductor which is provided with an electrical insulation surrounding the conductor.

The U.S. Pat. No. 4,493,873 and 4,537,804 describe an electrical conductor which is provided with an electrical insulation consisting of two layers arranged on the conductor, one consisting of a filler-free organic polymer and one of an organic polymer containing finely-divided aluminium oxide. The incorporation of the aluminium oxide in the insulation will increase the resistance of the insulation against corona (partial discharges).

According to the present invention, it has been found to be possible to provide an insulated conductor which withstands corona for a considerably longer period of time than the known conductor. According to the invention, this is achieved by arranging outside the insulation a layer of an organic polymer containing a sufficient quantity of a least one of the substances chromium oxide and iron oxide in powder form, preferably in a thickness which is smaller than the thickness of the underlying insulation.

The aluminium oxide used in the described, known case has a considerably higher intrinsic resistivity than chromium oxide and iron oxide. It is therefore surprising and completely unpredictable that chromium oxide and iron oxide, which are more low-resistive insulating materials than aluminium oxide, give a better insulation than the corresponding insulation with aluminium oxide. One possible explanation of the favourable results obtained according to the invention may be that the corona sputters away insulating polymer material from the surface layer to which chromium oxide or iron oxide has been added, and that the chromium oxide or iron oxide thus exposed, because of its lower resistivity, increases the electrical conductivity locally on the surface sufficiently for the extremely concentrated effect of a corona discharge to spread over a larger surface and hence be effectively reduced. In order for the dielectric losses in the insulation to be maintained at a low level, the layer of chromium oxide or iron oxide is arranged preferably in a thickness which is smaller than the thickness of the rest of the insulation.

More particularly, the present invention relates to a conductor provided with an electrical insulation surrounding the conductor, and to a protective layer surrounding the insulation and built up of an organic polymer and a powdered filler, which protective layer protects the insulation against degradation caused by corona, characterized in that the protective layer contains at least 10 per cent by volume of a powdered filler in the form of chromium oxide ($Cr_2O_3$), iron oxide ($Fe_2O_3$) or a mixture of chromium oxide ($Cr_2O_3$) and iron oxide ($Fe_2O_3$). The powdered filler preferably has an intrinsic resistivity of $10^4$–$10^8$ ohm m. The protective layer containing the filler preferably has a thickness which is smaller than the thickness of the underlying insulation, i.e. of the insulation located between the conductor and the protective layer. The protective layer preferably has a resistivity of above $10^{10}$ ohm m.

The electrical conductor according to the invention has the shape of a wire, rod, tape or bar, i.e. is elongated with a round or multi-corner constant cross-section. It can be used to advantage in windings for electrical machines, electrical transformers and other electrical high voltage equipment of varying types in which the insulation of the conductor can be subjected to corona.

Chromium is preferred as filler because of its property to give the protective layer a corona resistance which is not—or only insignificantly—reduced by the influence of external factors, such as moisture. The particle size of the powdered filler is suitably 0.005–30 $\mu$m and preferably 0.005–5 $\mu$m. The content of the powdered filler suitably amounts to 10–40% of the volume of the protective layer. Particularly preferred is a content of powdered filler of 10–30% of the volume of the protective layer.

The organic polymer in the protective layer may, among other things, consist of a wire enamel of such types as are normally used when enamelling winding wire such as terephtalic acid alkyds, polyester imides, polyamide imides, polyimides, polyurethanes, exoxy resins, polysulphons, silicones, polyamides, and polymers based on polyhydantoin.

The insulation surrounded by the protective layer may consist of resins without fillers, as specified in the preceding paragraph. However, it may also consist of a prefabricated polymer film, for example a film of polyamide imide, polyimide, polypropylene, polymethyl pentene, polyethylene glycol terephthalate, polycarbonate, or polysulphon wound helically around the conductor or wrapped around the conductor with a longitudinal joint, or of a wrapping of a glass fibre wire which is impregnated with a resin, for example an epoxy resin, and applied around the conductor, or a wrapping of a tape built up of a felt of fibres of an organic polymer such as aromatic polyamide (e.g. NOMEX ® 410 from Du Pont, USA).

The protective layer may be arranged as the outermost layer on the conductor. However, it may be provided with a coating when special demands are placed on the surface of the insulated conductor, such as diffusion density or surface fineness, and therefore a relatively thin filler-free organic polymer is applied as surface layer. The organic polymer may be of a kind as exemplified for the organic polymer in the protective layer. In certain cases, such as when there is a risk that the insulation may become detached from the surface of the conductor, for example because of the effect of oxygen diffused therein, it may be suitable to apply a layer of the same kind as the protective layer nearest the conductor, i.e. inside the insulation surrounded by the protective layer.

The thickness of the protective layer suitably amounts to 5 -100 $\mu$m and preferably to 10–50 $\mu$m, the thickness of the insulation located between the conductor and the protective layer suitably to 10–500 $\mu$m and preferably to 10–200 $\mu$m.

Figure 3:
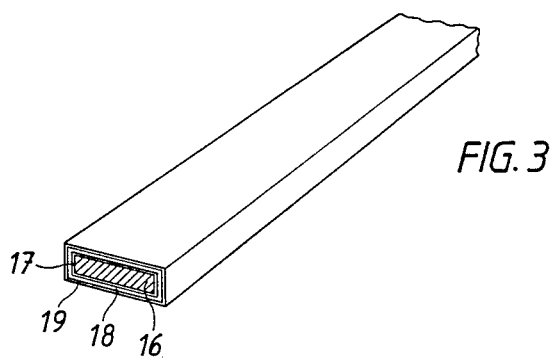
Figure 4:
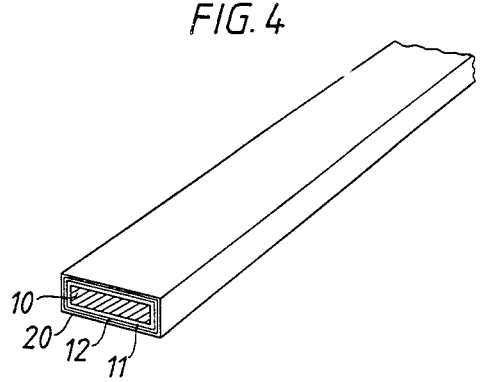
Figure 5:
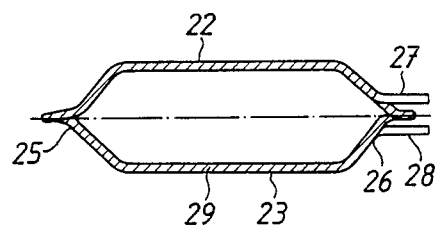
Figure 6:
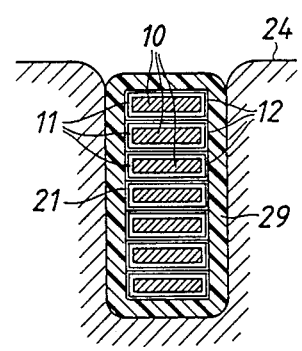

The invention will be explained in greater detail by means of examples with reference to the accompanying drawing, wherein FIGS. 1–4 show different embodiments of an insulated electrical conductor according to the invention, FIG. 5 shows a side view of a coil for an electrical machine, built up with a conductor according to the present invention, and FIG. 6 shows a cross-section of the same coil.

EXAMPLE 1

A rectangular cross-sectional wire 10, according to FIG. 1, with the cross-section 10 mm×2 mm is coated with polyesterimide wire enamel, for example Terebec ®533 L-33 from BASF (Fed. Rep. of Germany) in a conventional manner using multipass coating and wiping dies or felts, the wire passing twelve times through the wiping devices and a heating device with a temperature of about 400° C. for curing of the enamel, the increase in thickness upon each passage becoming approximately 5 μm. The finished layer 11 thus has a thickness of about 60 μm. On top of the layer 11 there is applied, using equipment of the same kind with four passages of wiping devices and associated heating devices, a protective layer 12 consisting of an epoxy resin and chromium oxide ($Cr_2O_3$) with a particle size of less than 5 μm. The protective layer has a thickness of 20 μm and the chromium oxide constitutes 25% of its volume. The epoxy resin used for the application of the protective layer may consist of 100 parts by weight of an epoxy resin of bisphenol A-type containing 5.15–5.5 moles epoxy groups per kg (e.g. Epikote 828 from Shell, Holland), and 50 parts by weight curing agent of amino type with an amino value of 400–460 mg KOH/g, dissolved in equal parts xylene and butanol. The epoxy resin contains 25 per cent by volume chromium oxide, calculated on the solid constituents of the resin without solvent. The thickness of the protective layer 12 constitutes 33% of the thickness of the insulation 11.

EXAMPLE 2

On a rectangular cross-sectional wire 10 with the cross-section 8 mm×2.5 mm, to which a wire enamel layer 11 of the same kind as described in Example 1 has been added, there is applied a protective layer 12 consisting of a polyesterimide containing chromium oxide of the same kind as described in Example 1. The protective layer 12 has a thickness of 20 μm and 30% of its volume consists of chromium oxide. The polyesterimide enamel used for the application of the protective layer may be of the same kind as that in the wire enamel layer 11, however chromium oxide and further cresol being added to the polyesterimide enamel so that the viscosity becomes suitable for the application of the protective layer using the same method as described in Example 1. The enamel then contains 30 per cent by volume chromium oxide, calculated on the contents of solid substance of the enamel without solvent. The thickness of the protective layer 12 constitutes 33% of the thickness of the insulation 11.

EXAMPLE 3

On a rectangular cross-sectional wire with the cross-section 8 mm×2.5 mm, to which a wire enamel layer 11 of the same kind as described in Example 1 has been added, there is applied a protective layer 12 consisting of a polyamideimide containing chromium oxide of the same kind as described in Example 1. The protective layer 12 has a thickness of 20 μm and 25% of its volume consists of chromium oxide. The polyamideimide enamel used for the application of the protective layer may consist of, for example Lack E 3561/27 from Herberts GmbH, Fed. Rep. of Germany, to which chromium oxide and N-methylpyrrolidone have been added so that the viscosity becomes suitable for the application of the protective layer using the same method as described in Example 1. The enamel then contains 25 per cent by volume chromium oxide, calculated on the solid constituents of the enamel without solvent. The thickness of the protective layer 12 constitutes 33% of the thickness of the insulation 11.

EXAMPLE 4

Figure 2:
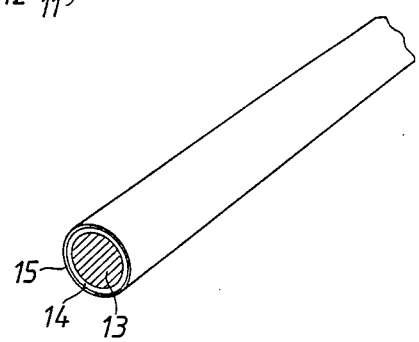

A round wire 13 according to FIG. 2 with a diameter of 1 mm is enamelled with a polyamideimide wire enamel, for example Lack E 3560/32 from Herberts GmbH. It is applied in the manner described in Example 1 using dies to form an enamel layer 14 having a thickness of 40 μm. On the layer there is applied a protective layer 15 of the same kind as the protective layer 12 in Example 3 but having a thickness of 10 μm and having a percentage by volume of chromium oxide of 15%. The application of the protective layer is also carried out using dies. The thickness of the protective layer 15 constitutes 25% of the thickness of the insulation 14.

EXAMPLE 5

Around a rectangular cross-sectional wire 16 according to FIG. 3 with a cross-section of 10 mm×4 mm there is wound, with half an overlap, a tape of a polyimide film (e.g. Kapton ® Type F from Du Pont, USA) having a thickness of 25 μm, which is provided on the side facing the conductor with a 12 μm, which is provided on the side facing the conductor with a 12 μm thick layer of fluorinated ethylenepropylene polymer (e.g. Teflon FEP ® from Du Pont, USA). This results in the occurrence of a 12 μm thick layer 17 of the fluorinated polymer nearest the conductor and outside of this a layer 18 of polyimide-fluorinated polymerpolyamide with a thickness of 62 μm. Overlapping parts of the tape are fixed to one another, and parts of the tape making contact with the conductor 16 are fixed to the conductor by the fluorinated ethylene propylene by the film being heated to a temperature of 270° C. in a heating device suited for the purpose. Around the conductor thus insualted there is applied a protective layer 19 of the same kind and thickness as the protective layer 12 in Example 1 and in manner specified there, with the difference that the percentage by volume of chromium oxide amounts to 15% instead of 25%. The thickness of the protective layer 12 constitutes 20% of the thickness of the insulation (layers 17 and 18).

EXAMPLE 6

A rectangular cross-sectional wire 10 according to FIG. 1 with the cross-section 10 mm×2 mm is provided with an insulating layer 11 in the form of a wrapping 11 of glass yarn which has been impregnated with a binder in the form of an epoxy resin, which has thereafter been cured. The epoxy resin may consist of a polyamide-modified epoxy resin (such as AF-42 from Minnesota Mining and Manufacturing Company, USA), or of an epoxy resin of the kind described in Example 1. The insualting layer 11 has a thickness of 100 μm. Around the layer 11 there is applied 12 in Example 1 and in the manner specified there, but with the difference that the percentage by volume of chromium oxide amounts to 10% instead of 25%, and the thickness of the protective layer 12 amounts to 40 μm instead of 20 μm. The thickness of the protective layer 12 constitutes 40% of the thickness of the insulation 11.

EXAMPLE 7

A rectangular cross-sectional wire according to FIG. 4 with the cross-section 10 mm×2 mm is enamelled with a layer 11 of a polyesterimide enamel in the manner described in Example 1 into a thickness of 60 μm and is provided with a protective layer 12 of epoxy resin with addition of chromium oxide also in the manner described in Example 1. On the protective layer 12 there is applied a coating 20 in the form of a polyamideimide enamel, for example Lack E 3561/27 from Herberts GmbH, Fed. Rep. of Germany, in a thickness of 20 μm. The coating can be applied in accordance with the method using multipass coating and wiping dies or felts, the wire passing through wiping equipment and associated heating equipment with a temperature of about 400° C. four times with an increase in thickness of the coating of about 5 μm upon each passage, so that the finished coating attains a thickness of about 20 μm.

Instead of chromium oxide ($Cr_2O_3$) in the cases exemplified above there can be used an equally great percentage by volume of iron oxide ($Fe_2O_3$) with the same size of the grains, as well as an equally great percentage by volume of a mixture of iron oxide and chromium oxide in arbitrary proportions, for example in equal parts by weight.

A conductor according to the present invention is excellently well suited for use in coils for electrical machines for operating voltages in excess of 3 kV. In such coils there are arranged around the conductor insulation layers of mica to render the conductor insulations resistant to the attack of corona. When using conductors according to the present invention in such coils it is possible to make the insulation and the corona protection around the conductors considerably thinner than when using the described known corona-resistant conductor insultation. In that way, more conductor material can be incorporated into the coil and for a certain machine dimension a greater power be obtained; also, for a certain power the machine dimension can be reduced.

Such a coil comprises a bundle of several adjacently arranged lengths of a conductor according to the present invention having rectangular cross-section and a main insulation surrounding the conductor bundle for insulation of the bundle against the machine slot.

The conductor bundle may consist of several turns of one single insulated conductor which has been bent while forming the final shape of the bundle. It may also consist of several separate insualted conductors, which at their ends are electrically connected to each other, usually parallel-connected. Particularly great advantages are obtained according to the invention for the former type of conductor bundle, since the stresses between adjacent conductors are in this case greater and a short-circuit caused by a damaged conductor insulation is more serious.

The main insulation may be formed in different, previously known ways. Thus, it may consist of a wrapping of mica tapes or mica sheets. These may be made of large mica flakes of conventional kind, which are attached to a carrier material of paper, woven glass fibre or the like, for example, with a resinous binder such as an alkyd resin or a thin thermoplastic film. The mica materials may also consist of self-supporting tape or sheet of small mica flakes, overlapping each other, manufactured by splitting of ordinary mica, these mica materials then usually also being attached to a carrier material.

On the mentioned mica tapes or mica sheets there may be applied a resinous binder which subsequently, when the materials are applied around the conductor bundle, binds the various layers in the conductor insulation to one another. Such a binder, however, may be supplied after the insulating material has been applied around the conductor bundle by an impregnation. As examples of suitable binders for the turns in the wrapping may be mentioned solvent-free resins such as epoxy resins and unsaturated polyester resins.

A conductor of a kind described in any of Examples 1-3 and 5-6 is bent into a coil containing several turns of the conductor positioned adjacent to each other, as shown in FIG. 5 and FIG. 6, respectively. The mentioned turns positioned adjacent to each other form the conductor bundle 21 of the coil. As will be clear from FIG. 5, the bending is carried out such that the coil has straight parts 22 and 23 intended to be positioned in the slots 24 of the machine, as well as bent end parts 25 and 26 which extend outside the slots. The terminals of the coil are designated 27 and 28.

The conductor bundle 21 is then wound turn-by-turn with, for example, half an overlap with a 25 mm wide mica tape consisting of a 0.09 mm thick self-supporting layer of small mica flakes which overlap each other and which are fixed to an 0.04 mm thick woven glass fibre with an 0.006 mm thick polyethyleneglycol terephthalate film. Such an insulating tape is described in Swedish Patent No. 200 820. After the bundle has been provided with a wrapping 29 of, for example, twenty layers of the mica tape placed on top of each other, the winding is first dried at a pressure of 0.1 mm Hg and at a temperature of 40° C., whereupon an impregnating resin is supplied at this pressure. When all impregnating resing has been supplied, the pressure is raised to, for example, 10 kg/cm². The resin may consist of 100 parts by weight of an epoxy resin, which in a known manner has been produced from epichlorhydrin and 4.4'-dioxydiphenyldimethylmethane and which has an epoxy equivalent of 192, and 100 parts by weight of a curing agent consisting of a mixture of 75 parts by weight hexahydrophthalic acid anhydride and 25 parts by weight tetrahydrophthalic acid anhydride. In order for the resin not to penetrate out of the insulation during a subsequent curing operation, the impregnated conductor bundle with the mica tape wrapping can be surrounded by a sealing tape of polytetrafluoroethylene or the like. The coil is then placed in a forming tool for curing of the resinous material. The curing takes place at a temperature of about 160° C. for a period of about 10 hours.

In an alternative embodiment a coil is manufactured using an insulating tape which is impregnated with impregnating resin prior to its wrapping around the bundle 21 (FIG. 6), which may be of the same kind as in the example above. The resin contains an unsaturated polyester resin manufactured from adipic acid (11 mole per cent), phthalic acid anhydride (11 mole per cent), maleic acid anhydride (23 mole per cent) and ethylene glycol (55 mole per cent) to which have been added, on the one hand, diallyl phthalate in such an amount that the diallyl phthalate constitutes 40% of the total weight of polyester resin and diallyl phthalate and, on the other hand, bensoyl peroxide in an amount corresponding to 1% of the entire weight of the resin. The polyester resin itself can be manufactured by reaction of a mixture of the mentioned acids and alcohol in an inert atmosphere by increasing the temperature to 220° C. and maintaining this temperature until the acid value of the reaction product is about 30. Prior to the impregnation of the insulating tape, 100 parts by weight of the resin is diluted with 100 parts by weight acetone. The insulating mica tape, which may be of the same kind as that described in Example 1, can be impregnated with the resinous material at room temperature and at atmospheric pressure. The impregnated mica tape is then wound, after driving off the solvent, around the conductor bundle 21 with half an overlap into thirty layers placed one above the other to form the main insulation 29. The coil is then placed in a forming tool for curing the resinous material at a temperature of 160° C. for a period of three hours.

Although many unsaturated polyester resins and epoxy resins suited for impregnation of electrical insulations are known, a few additional examples of such resins will be mentioned. Thus, there may be used, for example, a polyester resin consisting of 60 parts by weight of a reaction product of 3 moles maleic acid anhydride, 1 mole adipic acid, and 4.4 moles ethylene glycol with an acid value of 30, and of 40 parts by weight diallyl phthalate and containing 0.75% bensoyl peroxide, and a polyester resin consisting of 70 parts by weight of a reaction product of 1 mold fumaric acid, 1 mole phthalic acid and 2.2 moles propylene glycol with an acid value of 25, and of 30 parts by weight monostyrene and conntaining 0.5% bensoyl peroxide, as well as an epoxy resin consisting of 100 parts by weight "Epon 828" (Shell Chemical Co.) and 65 parts hexahydrophthalic acid anhydride, an epoxy resin consisting of 85 parts by weight "Araldit F", 100 parts by weight "Curing agent 905" (both from Ciba AG, Switzerland) and 15 parts by weight phenylglycidylether, an epoxy resin consisting of 100 parts by weight "DER 331" (Dow Chemical Co.) and 65 part by weight tetrahydrophthalic acid anhydride or 100 parts by weight epoxynovolak "DEN 438" (Dow Chemical Co.) and 3 parts by weight of the boron trifluoride complex "HZ 935 J 50" (Ciba Geigy AG).

We claim:

1. An electrical conductor insulated with a corona-resistant, multi-layer insulation system, comprising an insulation layer positioned around said conductor, and a protective layer positioned around said insulation layer, said protective layer being composed of a wire enamel-type of organic polymer and at least about 10 percent by volume of a powdered filler having an intrinsic resistivity of $10^4$ to $10^8$ ohms m. and selected from the group consisting of $Fe_2O_3$, $Cr_2O_3$, and mixtures thereof.

2. An electrical conductor as claimed in claim 1, wherein said powdered filler is $Cr_2O_3$ having an intrinsic resistivity of $10^4$ to $10^8$ ohm m.

3. An electrical conductor as claimed in claims 1 or 2, wherein said protective layer has a thickness less than the thickness of said insulation layer.

4. An electrical conductor as claimed in claim 1, wherein said protective layer has a resistivity of more than $10^{10}$ ohm m.

5. An electrical conductor as claimed in claim 1, wherein said powdered filler constitutes about 10 to 40 percent of the volume of said protective layer.

6. An electrical conductor as claimed in claim 1, further comprising a surface layer composed of a filler-free organic polymer on top of said protective layer.

7. An electrical conductor as claimed in claim 1, wherein the thickness of said protective layer is no greater than about 30 percent of the thickness of said insulating layer.

8. An electrical conductor as claimed in claim 1, wherein said organic polymer of said protective layer is a cured resinous binder.

9. An electrical conductor as claimed in claim 1, wherein said insulating layer is an organic resinous binder.

* * * * *